United States Patent [19]
Roy, Sr.

[11] Patent Number: 5,305,797
[45] Date of Patent: Apr. 26, 1994

[54] COMPARTMENTED CONDUIT TUBE CONSTRUCTION

[76] Inventor: John D. Roy, Sr., P.O. Box 380781, East Hartford, Conn. 06138

[21] Appl. No.: 58,140

[22] Filed: May 10, 1993

[51] Int. Cl.⁵ .............................. F16L 9/18
[52] U.S. Cl. .................... 138/108; 138/103; 138/109; 138/111; 138/115; 138/116
[58] Field of Search .............. 138/108, 109, 103, 111, 138/115, 155, 120, 92, 90, 94, 116; 174/95, 68.3, 101; 285/131

[56] References Cited

U.S. PATENT DOCUMENTS

| 259,045 | 6/1882 | Richardson | 138/115 |
| 470,237 | 3/1892 | Freeman | 138/115 |
| 508,967 | 11/1893 | Nesdall et al. | 138/111 |
| 706,974 | 8/1902 | Lyle | 138/115 |
| 805,665 | 11/1905 | Reagan | 138/115 |
| 2,282,073 | 5/1942 | McDonald | 138/111 |
| 3,133,753 | 5/1964 | Goodman et al. | 138/111 |
| 3,545,493 | 12/1970 | Freeman | 138/115 |
| 3,875,699 | 4/1975 | Lamarre | 138/115 |
| 4,824,288 | 4/1989 | Naito | 138/115 |
| 5,227,585 | 7/1993 | Zen | 138/115 |

FOREIGN PATENT DOCUMENTS

| 3823 | of 1901 | United Kingdom | 138/111 |
| 14962 | of 1902 | United Kingdom | 138/115 |

Primary Examiner—James E. Bryant, III
Attorney, Agent, or Firm—Leon Gilden

[57] ABSTRACT

A conduit tube is arranged to include intersecting partition walls dividing the associated conduit tube into four compartments to permit transport and positioning of cable within each compartment in a discrete relationship. The first and second ends of the conduit tube include locking blades, with each locking blade arranged for reception within an associated slot of a second tube member to secure a plurality of the conduit tubes together.

3 Claims, 4 Drawing Sheets

COMPARTMENTED CONDUIT TUBE CONSTRUCTION

BACKGROUND OF THE INVENTION

1. Field of the Invention

The field of invention relates to conduit tubes, and more particularly pertains to a new and improved compartmented conduit tube construction arranged for the positioning of cable therewithin.

2. Description of the Prior Art

Cable transporting tubes are available in the prior art and wherein U.S. Pat. No. 4,729,409 indicates the use of underground conduit having various elongate chambers therewithin.

The instant invention attempts to overcome deficiencies of the prior art by providing for compartmented structure in an association with registration blades permitting the end-to-end securement of a plurality of conduit tubes together and in this respect, the present invention substantially fulfills this need.

SUMMARY OF THE INVENTION

In view of the foregoing disadvantages inherent in the known types of conduit tube construction now present in the prior art, the present invention provides a compartmented conduit tube construction wherein the same is directed to the discrete positioning of various cables within discrete chambers of a conduit tube structure. As such, the general purpose of the present invention, which will be described subsequently in greater detail, is to provide a new and improved compartmented conduit tube construction which has all the advantages of the prior art conduit tube construction and none of the disadvantages.

To attain this, the present invention provides a conduit tube arranged to include intersecting partition walls dividing the associated conduit tube into four compartments to permit transport and positioning of cable within each component in a discrete relationship. The first and second ends of the conduit tube include locking blades, with each locking blade arranged for reception within an associated slot of a second tube member to secure a plurality of the conduit tubes together.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compartmented conduit tube construction which has all the advantages of the prior art conduit tube construction and none of the disadvantages.

It is another object of the present invention to provide a new and improved compartmented conduit tube construction which may be easily and efficiently manufactured and marketed.

It is a further object of the present invention to provide a new and improved compartmented conduit tube construction which is of a durable and reliable construction.

An even further object of the present invention is to provide a new and improved compartmented conduit tube construction which is susceptible of a low cost of manufacture with regard to both materials and labor, and which accordingly is then susceptible of low prices of sale to the consuming public, thereby making such compartmented conduit tube construction economically available to the buying public.

Still yet another object of the present invention is to provide a new and improved compartmented conduit tube construction which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
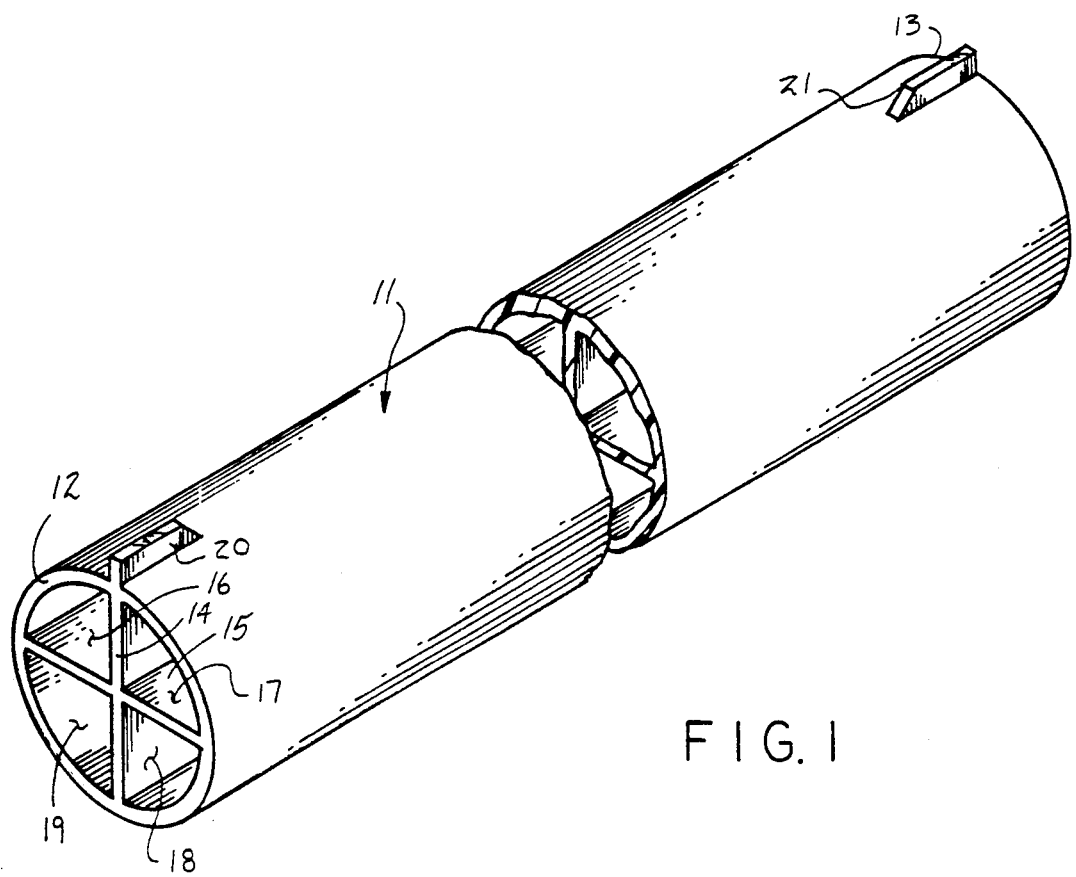
FIG. 1 is an isometric illustration of a compartmented tube construction, as indicated by the invention.
Figure 2:
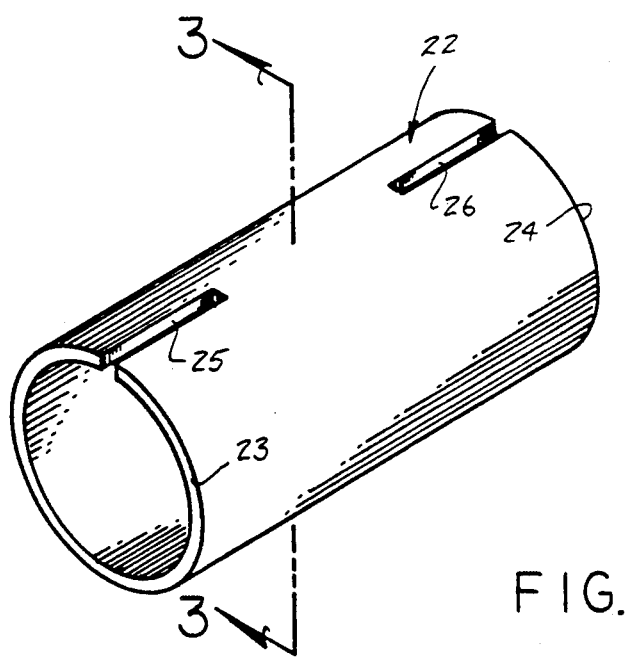
FIG. 2 is an isometric illustration of a connecting tube for use by the invention.
Figure 3:
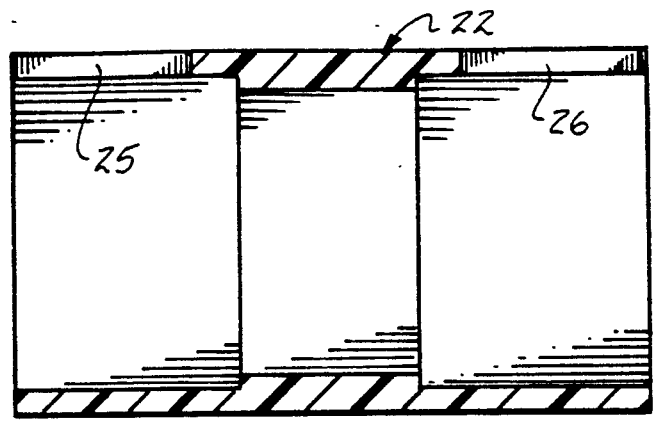
FIG. 3 is an orthographic view, taken along the lines 3—3 of FIG. 2 in the direction indicated by the arrows.
Figure 4:
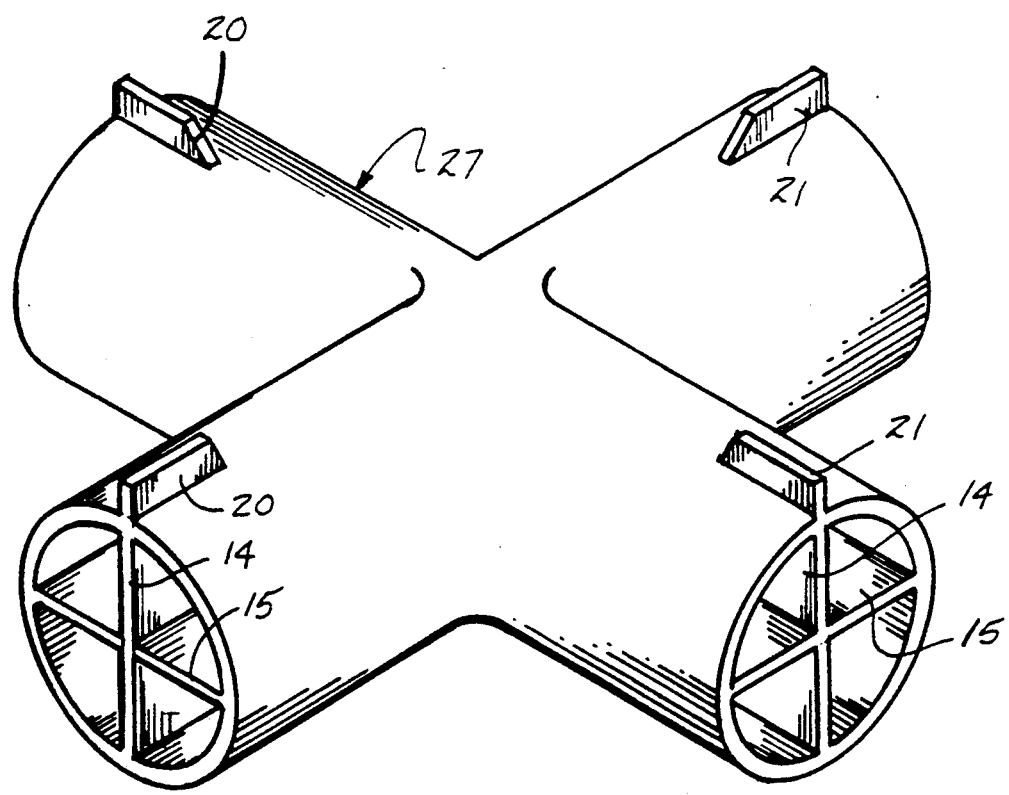
FIG. 4 is an isometric illustration of an X-shaped tube assembly as employed by the invention.
Figure 5:
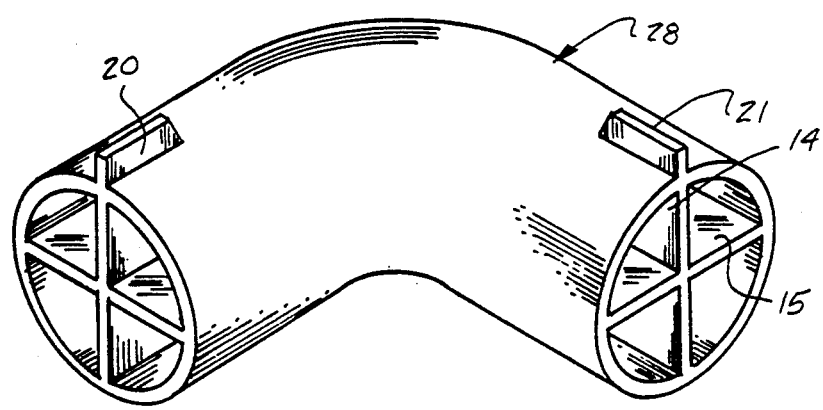
FIG. 5 is an isometric illustration of an arcuate tube assembly as employed by the invention.

With reference now to the drawings, and in particular to FIGS. 1 to 8 thereof, a new and improved compartmented conduit tube construction embodying the principles and concepts of the present invention and generally designated by the reference numerals 11-33 will be described.

More specifically, the compartmented conduit tube construction of the invention essentially comprises a first tube member 11, having a first end 12 spaced from a second end 13, including respective first and second orthogonally intersecting partition walls 14 and 15 that are each diametrically aligned within the respective first tube member 11 extending from the first end 12 to the second end 13, defining respective first, second, third, and fourth chambers 16, 17, 18, and 19. First and second blades 20 and 21 are aligned relative to one another and mounted to an interior surface of the first tube member 11 at the first and second ends 12 and 13, with the first and second blades 20 and 21 each of a predetermined length. A second tube member 22 is provided arranged to receive one of the first tube member's first and second ends 13 and 14 within a second tube member's first and second 23 and 24, such that the second tube member includes first and second slots 25 and 26 of said predetermined length arranged to receive one of said first and second blades 20 and 21, as the second tube member 22 complementary receives the first tube member therewithin said predetermined length.

It should be noted that respective X-shaped tube assemblies 27, as well arcuate tube assemblies 28, as well as other configurations of the first tube member 11 may be provided relative to need of the tube construction, with each including the requisite intersecting partition walls 14 and 15, as well as the registration blades 20 and 21 at each end of the associated tube members.

Figure 6:
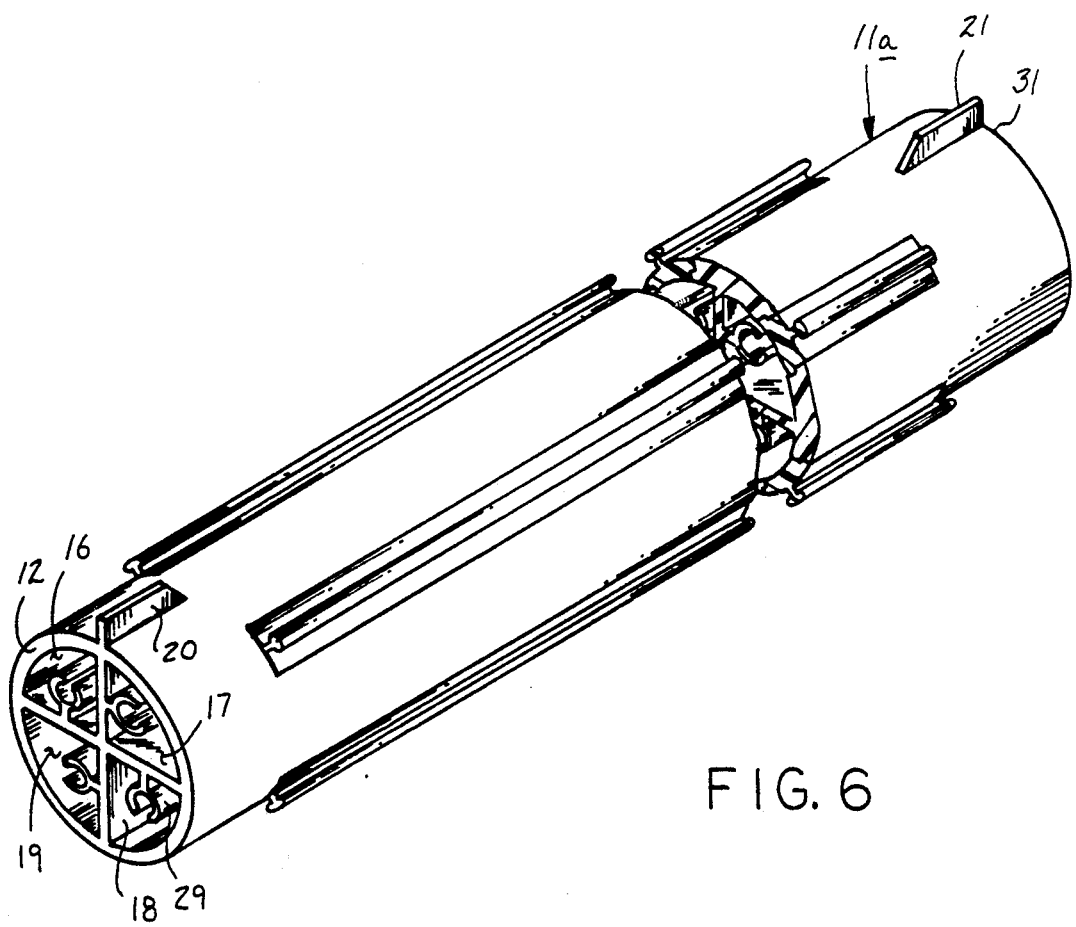
FIG. 6 is an isometric illustration of a modified tube member of the invention.
Figure 7:
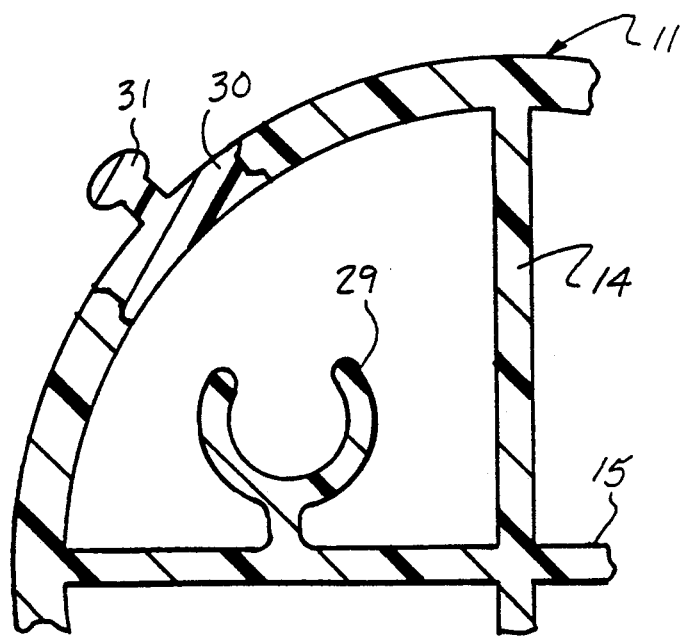
FIG. 7 is an enlarged orthographic view of one of the chambers of the invention, as indicated in FIG. 6.

The FIG. 6 indicates the use such that each of the chambers 16-19 mounts a C-shaped resilient support channel 29 coextensively of the channel to receive a cable member therewithin. Further, an inspection plate 30 removably mounted for access into each chamber is mounted to the side wall of the first tube member, and specifically the modified first tube member 11a, as indicated in FIG. 6, with the inspection plate 30 having a handle 31 to permit ease of removal of the inspection plate for visual observation and access to various cables within the respective chamber. Such construction is indicated in FIG. 7.

Figure 8:
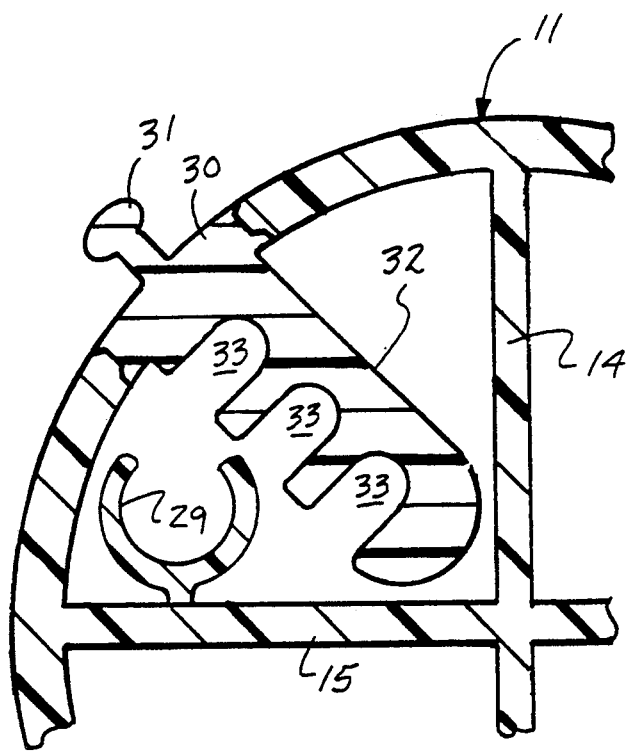
FIG. 8 is the use of a modified inspection plate structure, as indicated in FIG. 7.

FIG. 8 indicates the use of each chamber additionally to the inspection plate 30 having inspection plate mounting a projecting flange 32, wherein the projection flange 32 includes a plurality of spaced slots 33 to support cables, whereupon withdrawal of the inspection plate 30 from an associated chamber removes wires mounted within the slots 33 for visual observation and maintenance of such cables and wires.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A compartmented conduit tube construction, comprising,
   a first tube member and a second tube member, the first tube member having a first tube member first end spaced from a first tube member second end, and
   a first partition wall diametrically directed within the first tube member coextensive thereof extending from the first tube member first end to the first tube member second end, and
   a second partition wall orthogonally intersecting said first partition wall, with the second partition wall diametrically aligned within the first tube member and extending from the first member end to the first tube member second end, with the first partition wall and the second partition wall defining respective first, second, third, and fourth chambers, and
   the first tube member having an exterior surface, and the exterior surface includes a first blade and a second blade mounted to the exterior surface in adjacency to the respective first tube member first end and the first tube member second end, with the first blade and the second blade having a predetermined length, and
   said second tube member including a second tube member first end and a second tube member second end arranged to complementarily receive the first tube member therewithin, wherein the second tube member includes a first slot directed into the second tube member at the second tube member first end, and a second slot directed into the second tube member at the second tube member second end projecting through the second tube member second end, wherein the first slot and the second slot each have a slot length equal to said predetermined length to receive an individual one of said blade and said second blade therewithin, and
   each chamber includes a resilient C-shaped support channel coextensive with each chamber for securing removable within said support channel.

2. A tube construction as set forth in claim 1 wherein each chamber includes an inspection plate directed through the first tube member, wherein the inspection plate includes an inspection plate handle projecting exteriorly of the first tube member permitting removal of the inspection plate for access to an individual one of said first chamber, second chamber, third chamber, and fourth chamber.

3. A tube construction as set forth in claim 2 wherein said inspection plate a projecting flange extending within an individual chamber of said first chamber, second chamber, third chamber, and fourth chamber, wherein the projecting flange includes a plurality of spaced parallel slots, wherein each of said parallel slots is arranged to secure a cable therewithin.

* * * * *